United States Patent Office 3,155,456
Patented Nov. 3, 1964

3,155,456
PROCESS OF PREPARING HYDRAZINIUM AZIDE
Ulysses V. Henderson, Jr., and Welby G. Courtney, Richmond, Va., assignors to Texaco Experiment Incorporated, Richmond, Va., a corporation of Virginia
No Drawing. Filed June 23, 1961, Ser. No. 119,039
7 Claims. (Cl. 23—101)

This invention relates to a method of preparing an inorganic compound. More particularly, this invention relates to a novel process for the preparation of hydrazinium azide.

The need for high energy fuels is continuously increasing because of the demand for such products in reaction-propulsion engines for missiles and rockets as boosters for satellites and for civilian jet aircraft. Hydrazinium azide has important use as such a fuel.

Hydrazinium azide upon decomposition yields a relatively large volume of gas per unit weight. For example, one mol of hydrazinium azide yields five mols of gas when decomposition is complete. Actually some ammonia is also formed when hydrazinium azide decomposes. When complete decomposition is accomplished one gram of hydrazinium azide will yield approximately 1.5 liters of gas.

As a fuel for a reaction-propulsion engine, hydrazinium azide, alone or in mixtures with other high energy materials, can be pressed into a solid fuel propellant grain and used as a monopropellant. The propellant grain containing the hydrazinium azide, alone or in mixtures, can be used with oxidizing materials whereby the hydrogen from the decomposition is oxidized with release of additional energy. Hydrazinium azide is useful as an additive in other solid or liquid rocket fuel compositions especially in those compositions which are deficient in the volume of gas produced. The azide provides the necessary working gas and at the same time does not adversely affect the impulse of fuel compositions.

Heretofore hydrazinium azide was prepared by the reaction between anhydrous hydrazine and alcoholic or ethereal solutions of hydrazolic acid. However, by this process a product was obtained that was relatively impure and required repeated recrystallization before further use could be made thereof. In this process the hydrazinium azide also was obtained in a relatively low yield. In addition, the preparation of the hydrazoic acid solution entails considerable hazard and is quite time consuming. The method of the present invention is comparatively safe and is accomplished in about one-tenth the time required for the hydrazoic acid procedure. In addition, the hydrazinium azide yield in the process of the present invention may be as high as 70% or more as compared to the 30-40% yield obtained in the method involving the reaction of hydrazine with hydrazoic acid.

It has been discovered that hydrazinium azide may be prepared by reacting an alkali metal or an alkaline earth metal azide and a hydrazine salt of a strong inorganic acid in a suitable solvent at a temperature of between about 100° C. and 135° C. A prefered modification of the method of the present invention involves the addition of hydrazine to the metal azide-hydrazine salt reaction mixture. A typical equation for the reaction of the present invention is as follows:

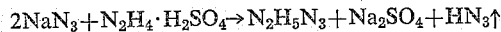

As shown in the above equation the reaction utilizing only the azide and the salt, half of the sodium azide reactant is converted to hydrazoic acid, $HN_3$, which is given off as a gas. In the prefered modification of the present invention the addition of a mol of hydrazine results in conversion of all of sodium azide to hydrazinium azide as illustrated in the following equation:

The additional mol of hydrazine may also be added by replacing the hydrazine salt with a di-hydrazine salt as shown in the following equation:

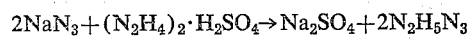

The reactants may be used in the method of the present invention in mol ratios ranging from one mol of metal azide to two moles of hydrazine salt to two moles of metal azide to one mol of hydrazine salt. The preferred ratio, however, is that the reactants be reacted in substantially stoichiometric amounts. The addition of hydrazine to the metal azide and hydrazine salt is accomplished in an amount of 0.5 to 1.5 mols of hydrazine per mol of metal azide.

The reaction may be run for a time of from about 10 minutes to 2 hours. In order to obtain the highest yield, it has been found that the most profitable time is 10 to 30 minutes. It should also be noted that when using a reaction temperature in the low end of the range, for example, 100° C. to 110° C., the reaction time should be selected from the higher end of the range, 20 to 30 minutes and conversely when the reaction temperature is selected from the high end of the range, 125° C. to 135° C. the reaction time should be 10 to 20 minutes.

A particular feature of the present invention is the selection of the solvent in which the reaction takes place. The selection of the solvent depends on the following factors:

The solvent must not dissolve appreciable amounts of the reactants, that is, the metal azide, hydrazine or the hydrazine salt, or the metal salt produced in the reaction even at elevated temperatures. The solvent must, however, dissolve hydrazinium azide at an elevated temperature in the range of about 60° C. to about 135° C. at normal atmospheric pressure. The hydrazinium azide must, however, have a much lower solubility in the solvent when cold, that is, below about 50° C.

The solvent must have the foregoing properties to simplify separation of the hydrazinium azide from the reactants and the metal salt reaction product.

For the sake of expediency a solvent having a boiling point at atmospheric pressure in the range of 100° C. to 135° C. is most desirable. However, other solvents may be made to conform to the desired boiling range by the standard adjustment of pressure in order that reaction can take place within that range.

The reason for the temperature limitation is that below about 100° C. reaction fails to take place and above 135° C. decomposition of the resulting hydrazinium azide occurs at an increased rate resulting in a decrease in yield.

Oxygenated hydrocarbons demonstrate the above solvent properties and these are $C_2$ to $C_8$ aliphatic alcohols, $C_3$ to $C_8$ aliphatic ether alcohols and mixtures thereof.

The solvents that may be employed in the present invention are exemplified by ethanol, propanol, isopropanol, butanol, isobutanol, amyl alcohol, isoamyl alcohol, hexanol, heptanol, octanol, methyl Cellosolve, Cellosolve, n-propyl Cellosolve, isopropyl Cellosolve, n-butyl Cellosolve, methyl Carbitol, Carbitol, n-propyl Carbitol, isopropyl Carbitol and n-butyl Carbitol.

The alkali metal and alkaline earth metal azides that are utilized in the process of the present invention are lithium, sodium, potassium, calcium, strontium and barium azides.

The hydrazine salts of strong inorganic acids are hydrazine sulfate ($N_2H_4 \cdot H_2SO_4$) and hydrazine hydrochloride ($N_2H_4 \cdot HCl$).

A general method of the novel process of the present invention is illustrated as follows:

A quantity of the solvent equal to about 50 to 100 times the theoretical yield of hydrazinium azide is heated to a reaction temperature usually within the range of about 100° C. to 135° C. and preferably about 110° to 125° C. The hot solvent is added to the reactant mixture consisting of approximately stoichiometric amounts of the metal azide, hydrazine and the hydrazine salt. The reaction is continued with vigorous stirring for about 15 to 30 minutes and preferably 15 to 20 minutes. Unreacted metal azide, hydrazine and hydrazine salt, if any, and the resulting by-product metal salt are then allowed to settle and a supernatant liquid is removed by filtration or decantation and allowed to cool. The hydrazinium azide then crystallizes and is separated by filtration, washed with ether and dried. A very pure hydrazinium azide is obtained in a yield of about 60 to 70% of theoretical.

The following Examples 1 to 6 are exemplary of the preparation of hydrazinium azide by the novel process of the present invention. Examples 1 to 4 show the preparation of hydrazinium azide by the method of reacting only the metal azide and the hydrazine salt. Examples 5 and 6 show the preparation of hydrazinium azide by the preferred procedure utilizing hydrazine as an additional reactant.

*Example 1.*—1 gram of hydrazine sulfate and 2 grams of sodium azide were refluxed in 30 ccs. of n-butanol for 2 hours at 117° C. The solvent was decanted and was cooled. A crystalline product was isolated which was washed with ether and dried. The product was identified as hydrazinium azide and was obtained in a yield of 34.7% of theoretical.

*Example 2.*—2 grmas of hydrazine sulfate and 2 grams of sodium azide were refluxed in 30 ccs. of n-butanol for 1½ hours at 117° C. The solvent was decanted and was cooled. A crystalline product was isolated which was washed with ether and dried. The product was identified as hydrazinium azide and was obtained in a yield of 34.7% of theoretical.

*Example 3.*—2 grams of hydrazine sulfate and 2 grams of sodium azide were refluxed in 50 ccs. of n-butanol for 15 minutes at 117° C. The solvent was decanted and was cooled. A crystalline product was isolated which was washed with ether and dried. The product was identified as hydrazinium azide and was obtained in a yield of 52.1% of theoretical.

In Examples 1 and 2 it can be seen that a yield of only 34.7% was obtained. This was due to the fact that the reaction time was held for from 1½ to 2 hours. This long reaction time not only allows for the loss of hydrazoic acid during reflux but also allows for the thermal decomposition of hydrazinium azide which has been formed. In addition, the use of such small volumes of solvent as 30 ccs. does not allow for sufficient amount of hydrazinium azide to be dissolved and thereafter recovered as an end product.

*Example 4.*—8.66 grams of hydrazine sulfate and 8.66 grams of sodium azide were refluxed in 500 ccs. of n-butanol for 15 minutes at 117° C. The solvent was decanted and was cooled to a temperature of 10° C. A crystalline product was isolated which was washed with ether and dried. The product was identified as hydrazinium azide and was obtained in an amount of 2.9 grams or a yield of 58%.

*Example 5.*—4.33 grams of hydrazine sulfate, 1.1 grams of hydrazine and 4.33 grams of sodium azide were refluxed in 500 ccs. of n-butanol for 15 minutes 117° C. The solvent was decanted and was cooled to a temperature of 10° C. A crystalline product was isolated which was washed with ether and dried. The product was identified as hydrazinium azide and was obtained in an amount of 2.9 grams or a yield of 58%.

A comparison of Examples 4 and 5 demonstrates that the addition of hydrazine in the reaction improves the utilization of ingredients by almost 100%. Even though the theoretical yield is the same in both reactions, in Example 4, twice the amount of hydrazine sulfate and sodium azide than used in Examples 5 were used to obtain 2.9 grams of hydrazinium azide. In Example 5 with the addition of only 1.1 grams of hydrazine to the reactants the yield was the same 2.9 grams of hydrazinium azide.

*Example 6.*—17.33 grams of hydrazine sulfate, 17.33 grams of sodium azide and 4 grams of hydrazine were refluxed in 2 liters of n-butanol for 15 minutes at 117° C. The solvent was decanted and was cooled to a temperature of about 5° C. A crystalline product was isolated which was washed with ether and dried. The product was identified as hydrazinium azide and was obtained in a yield of 70%.

Example 6 shows the most preferred method of the present invention, that is, utilizing hydrazine as an additional reactant, refluxing for only 15 minutes and using a sufficiently large volume of solvent to dissolve as much hydrazinium azide produced as possible. This example also shows the advantage obtained in cooling to a very low degree, namely, 5° C. thereby obtaining a yield of 70%.

Examples 7 and 8 following illustrate two situations in which the desired end product, hydrazinium azide, was not obtained.

*Example 7.*—2 grams of hydrazine sulfate, and 2 grams of sodium azide were reacted in 50 ccs. of dimethyl formamide at 154° C. The solvent was decanted and was cooled to a temperature of −70° C. No crystalline product was isolated even at −70° C.

*Example 8.*—1.5 grams of hydrazine sulfate and 2 grams of sodium azide were held in 30 ccs. of n-butanol for 3 hours at a reaction temperature of 70° C. No product was isolated when the solvent was decanted and subjected to reduced temperature.

It has been postulated that no product was obtained in Example 7 because of the high temperature of reaction and the properties of the solvent. Example 8 shows that if the reaction is carried out below the desired temperature range no product is obtained.

Whereas n-butanol has been found to be the most preferred solvent for carrying out the reaction, other solvents may also be successfully used.

The very short reaction time indicates that the preparation of hydrazinium azide in accordance with the present invention may be carried out as a continuous process operation. Heated solvent and the reactants are added to a reactor of suitable size to give the desired reaction time followed by a continuous filtration to separate by-products from the solution of the azide in the solvent. The solvent chilled to precipitate the azide is separated by a second filtration. The solvent is then recycled to the reactor with heating and additional reactants added.

We claim:

1. A process of preparing hydrazinium azide comprising reacting at a temperature from about 100° C. to 135° C. a metal azide selected from the group consisting of alkali metal and alkaline earth metal azides and a hydrazine salt selected from the group consisting of hydrazine sulfate and hydrazine hydrochloride in an oxygenated hydrocarbon solvent selected from the group consisting of $C_2$ to $C_8$ aliphatic alcohols, $C_3$ to $C_8$ aliphatic ether-alcohols and mixtures thereof and recovering said hydrazinium azide from said reaction mixture.

2. The process of claim 1 in which hydrazine is added to the reaction mixture of said metal azide and said hydrazine salt.

3. A process as described in claim 1 in which said reaction is carried out for a period of time from about 10 to 30 minutes.

4. A process as described in claim 1 in which said metal azide and said hydrazine salt are present in approximately stoichiometric amounts.

5. A process as described in claim 1 in which said solvent is present in an amount equal to about 50 to 150 times the theoretical yield of said hydrazinium azide.

6. A process as described in claim 2 in which said metal azide, hydrazine and said hydrazine salt are present in approximately stoichiometric amounts.

7. The process of preparing hydrazinium azide comprising reacting in approximately stoichiometric amounts sodium azide, hydrazine and hydrazine sulfate at a temperature of between 115° C. and 120° C. in n-butanol in an amount equal to about 100 times the theoretical yield of said hydrazinium azide, said reaction to be carried out for about 10 to 20 minutes, decanting the supernatant liquid, cooling said supernatant liquid in order to crystallize the said hydrazinium azide, filtering off said crystallized hydrazinium azide, washing said crystallized hydrazinium azide with ether and drying.

References Cited in the file of this patent

Mellor: "Comprehensive Treatise on Inorganic and Theoretical Chemistry," Longmans, Green and Company, New York, 1928, volume VIII, pages 329, 335, 344, 345.